(12) United States Patent
Kramer et al.

(10) Patent No.: US 6,629,576 B2
(45) Date of Patent: Oct. 7, 2003

(54) SYSTEM FOR SUPPORTING THE TORQUE OF AN INTERNAL-COMBUSTION ENGINE

(75) Inventors: Andreas Kramer, Erdmannhausen (DE); Andreas Munzert, Marugröningen (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 71 days.

(21) Appl. No.: 09/858,925

(22) Filed: May 17, 2001

(65) Prior Publication Data

US 2002/0011376 A1 Jan. 31, 2002

(30) Foreign Application Priority Data

May 17, 2000 (DE) .......................... 100 24 164

(51) Int. Cl.⁷ .............................. B60K 5/00; B60K 5/12
(52) U.S. Cl. ........................ 180/291; 180/299
(58) Field of Search ................................ 180/291, 292, 180/300, 297, 298, 299; 248/560, 580, 592, 593, 603, 605, 607, 638

(56) References Cited

U.S. PATENT DOCUMENTS 3,825,090 A * 7/1974 Runkle et al. .............. 180/292
3,841,426 A * 10/1974 Nemschoff ................. 180/53.1
4,240,517 A * 12/1980 Harlow et al. .............. 180/295
4,643,270 A * 2/1987 Beer .......................... 180/299
4,685,531 A * 8/1987 Kopich ....................... 180/300
5,039,073 A * 8/1991 Reichard et al. ........ 267/140.13
5,570,757 A * 11/1996 Courtwright et al. ....... 180/291
6,234,268 B1 * 5/2001 Savage et al. .............. 180/300
6,269,900 B1 * 8/2001 Adams et al. .............. 180/274
6,390,223 B1 * 5/2002 Savage et al. .............. 180/300

FOREIGN PATENT DOCUMENTS

| DE | 3808762 A1 | 9/1989 |
| DE | 4209316 A1 | 10/1992 |
| DE | 19731128 C2 | 9/1999 |
| FR | 2731184 A1 | 9/1996 |
| JP | 03005239 | 1/1991 |

* cited by examiner

Primary Examiner—Brian L. Johnson
Assistant Examiner—Bridget Avery
(74) Attorney, Agent, or Firm—Crowell & Moring LLP

(57) ABSTRACT

A system for supporting the torque of an internal-combustion engine has a support arranged transversely in the vehicle. This support has a strut as well as a support arm. These two support parts are connected with one another by way of an elastic bearing, the strut being fastened on a camshaft housing and the support arm being fastened on the side member of the vehicle. The elastic bearing is connected with the vehicle body structure, for example, on a spring strut dome, by way of a console.

18 Claims, 4 Drawing Sheets

SYSTEM FOR SUPPORTING THE TORQUE OF AN INTERNAL-COMBUSTION ENGINE

BACKGROUND AND SUMMARY OF THE INVENTION

This application claims the priority of German Patent Document 100 24 164.6, filed in Germany, May 17, 2001, the disclosure of which is expressly incorporated by reference herein.

The invention relates to a system for supporting the torque of an internal-combustion engine in a vehicle by way of at least one torque support which is arranged transversely in the vehicle between the internal-combustion engine and a vehicle body support member and is connected with the vehicle body structure.

From German Patent Document DE 42 09 613, an assembly bearing is known which has a torque support consisting of a rigid support. This support is arranged between an assembly and a vehicle frame, elastic bearings being provided in the support.

It is an object of the invention to provide a torque support system for an internal-combustion engine by means of a torque support which, on the one hand, permits idling movements of the assembly and does not transmit them and, on the other hand, ensures a torque support during the operation and furthermore ensures a simple mounting.

According to preferred embodiments of the invention, this object is achieved by providing a system for supporting the torque of an internal-combustion engine in a vehicle by way of at least one torque support which is arranged transversely in the vehicle between the internal-combustion engine and a vehicle body support member and is connected with the vehicle body structure wherein the torque support is constructed of at least two parts and comprises a support arm connected with one of a cylinder head cover and a camshaft housing by a pivoting bearing, and an adjoining strut held by way of a stationary elastic bearing, which strut is fastened on an end side on a support member of body structure of the vehicle.

The advantages achieved by means of the invention are essentially that, in the case of occurring torque during the operation, the internal-combustion engine is supported by way of the torque support on the side member of the vehicle body. According to the invention, torque supports pointing to the side members can also be arranged on each side of the assembly.

For this purpose, the torque support is constructed of at least two parts and includes a support arm connected with a cylinder head cover and a camshaft housing by means of a relatively stiff pivoting bearing as well as of an adjoining strut held by means of a stationary elastic bearing, which strut is fastened on the end side on a support member of the body structure.

So that a buckling of the torque support during the operation is avoided, in certain preferred embodiments the support arm is fastened by means of one end by way of a console, in which the pivoting bearing is held on the cylinder head cover or on the camshaft housing, and is supported by means of its other end, which faces away, in the elastic bearing which is stationarily disposed by way of a receiving block on the spring strut dome. By means of this construction and support of the torque support according to the invention, the force generated by the assembly is linearly introduced into the side member of the vehicle body, vibrations during the idling of the internal-combustion engine being kept away from the vehicle body.

For the support on the spring strut dome, the strut is rigidly connected with the receiving block and, by means of an end pointing to the support arm, is supported in the elastic bearing which is held in the receiving block.

So that the expenditures for fastening the receiving block on the vehicle body structure can be minimized, an already existing screwing point of a bearing block is used in which the spring strut is disposed.

The strut is connected with the support arm by way of an elastic bearing which is held in the receiving block, the elastic bearing being arranged in an eye of the support arm, and the support arm being situated between the receiving block and the strut. For the purpose of fastening, the receiving block reaches over the strut by means of two arms, and for the fastening with the spring strut dome, the latter has a bent-out section which is fixed at the spring strut dome by means of at least one screw.

As a result, the strut has a rigid construction from the linkage to the side member to the receiving block, and the adjoining support arm is swivellable by way of the elastic bearing as well as by way of the pivoting bearing which is supported in a console supporting block which is connected with the camshaft housing and which, for this purpose, is constructed with a foot which can be fastened on the camshaft housing.

The connecting elastic bearing between the strut and the support arm acts as a so-called damping bearing and has a very progressively coordinated characteristic curve and comprises two kidney-shaped recesses which are aligned in the direction of the pressure load of the torque support behind one another in a horizontal plane.

In contrast, the pivoting bearing of the support should permit only rotational movements during the springing of the assembly. It can consist either of a rubber bearing with a high radial stiffness and a relatively low resistance to torsion or it can be constructed as a ball bearing.

So that the force generated by the assembly can be linearly introduced into the vehicle body side member, the linking of the support arm to this side member takes place by means of a sheet metal angle which can be connected with the side member of the vehicle body structure and, for this purpose, has legs which reach over the side member from above and below, and the strut ends approximately in the center of the member.

The sheet metal angle is a folded sheet metal part which is easy to produce and which introduces the force, if possible, in the center into the side member by way of the walls situated in the direction of the force.

Other objects, advantages and novel features of the present invention will become apparent from the following detailed description of the invention when considered in conjunction with the accompanying drawings.

DETAILED DESCRIPTION OF THE DRAWINGS

Figure 1:
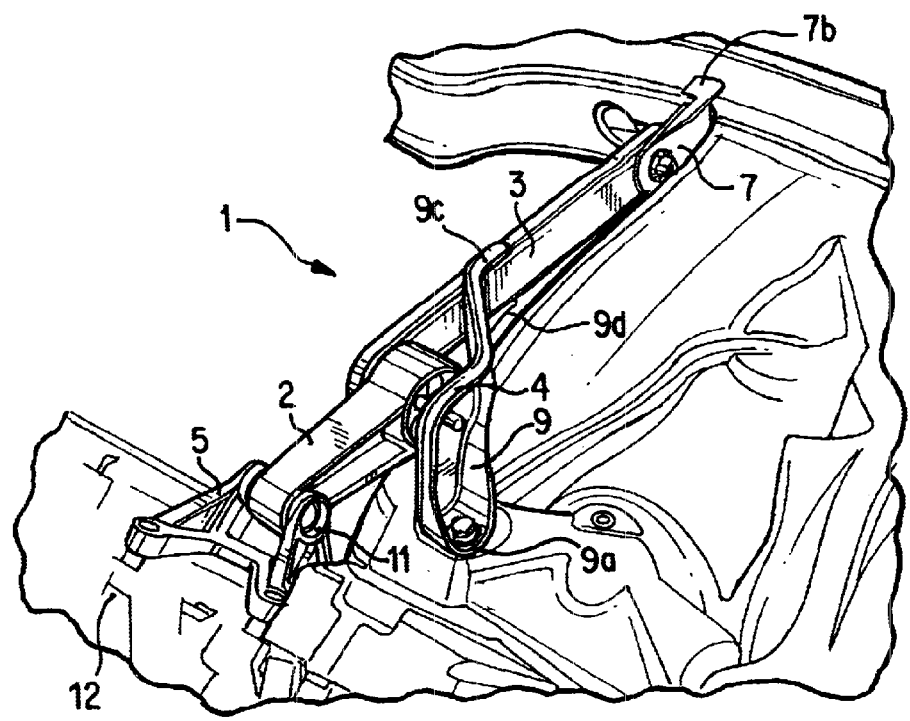
FIG. 1 is a diagrammatic representation of an installed torque support system according to a preferred embodiment of the invention, with a strut and a support arm, and a fastening on the side member, on the spring strut dome and on the camshaft housing.

The system for the torque support comprises essentially a strut 3, a support arm 2 as well as a connecting elastic bearing 4. By means of a pivoting bearing 11, the support arm 2 is connected by way of a console supporting block 5 with the camshaft housing 6, and the strut 3 is connected by way of a sheet metal angle 7 with a side member 8 of the vehicle body. By way of a receiving block 9, the strut 3 is supported on the spring strut dome 10 of the vehicle.

Figure 2:
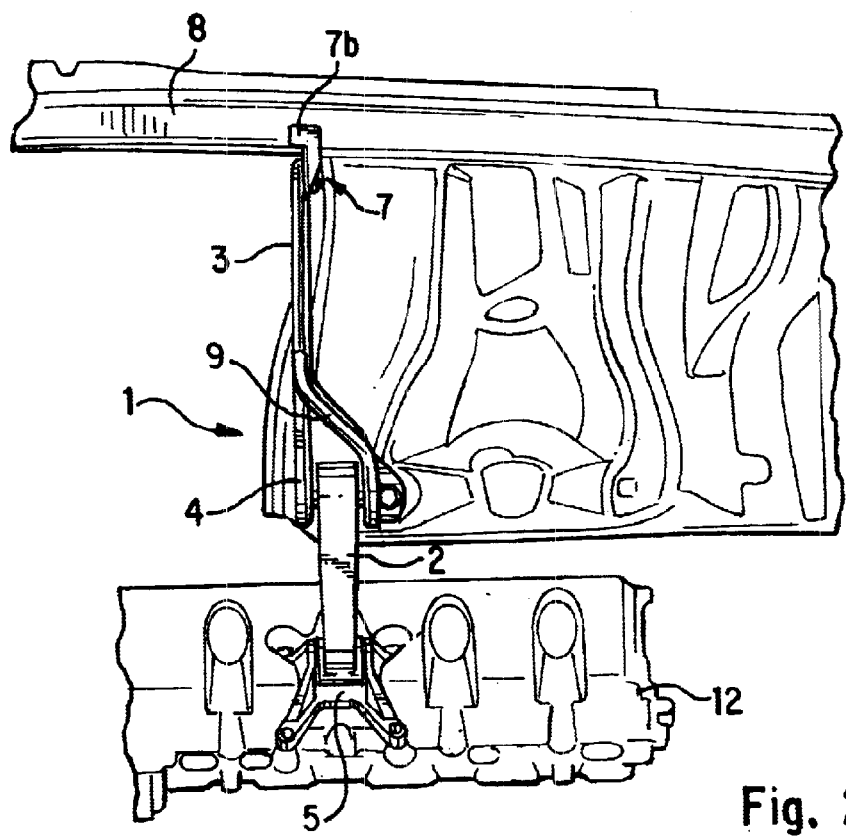
FIG. 2 is a top view of the torque support system.
Figure 3:
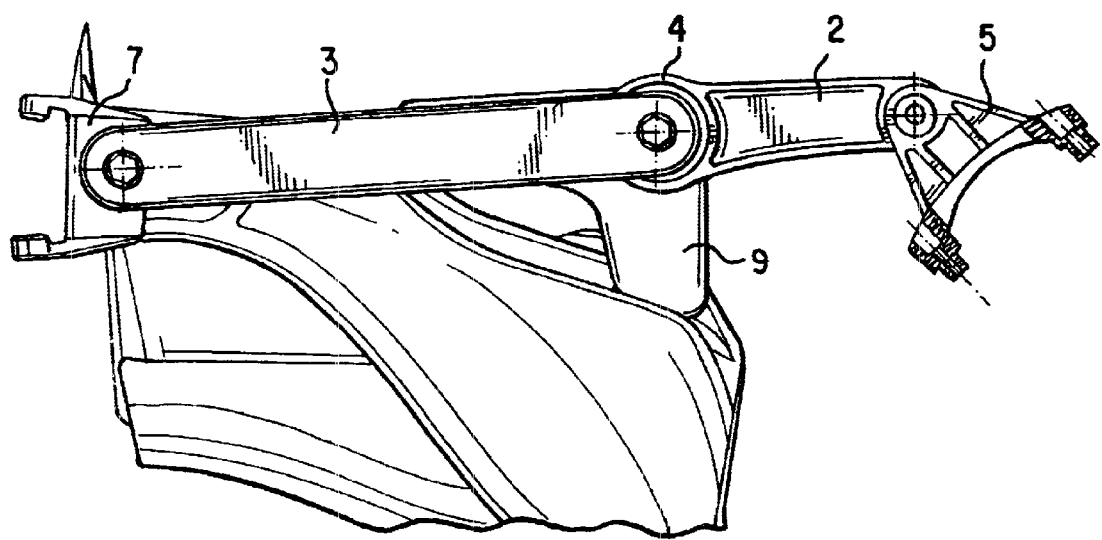
FIG. 3 is a frontal view of the torque support system, with the console supporting block.

The strut 3 and the support arm 2 of the torque support 1 are arranged approximately in a horizontal plane and, for supporting torques of the assembly and for receiving idling vibrations, extend from the cylinder head cover 12 to a side member 8 arranged laterally of the vehicle body, as illustrated in detail by FIG. 2.

The strut 3 and the support arm 2 are connected with one another by way of an elastic bearing 4 which is held in an eye of the support arm 2 and is supported on a bearing pin which is connected with the strut 3 and the receiving block 9. Instead of consisting of a sheet metal profile, the strut 3 and the receiving block 9 can also be produced as a cast part.

The bearing 4 in the support arm 2 has kidney-shaped recesses 13, 14 which are arranged in the direction of the pressure load and/or tensile load F2 of the support arm 2 behind one another in a horizontal plane X—X. As a result of this arrangement of the recesses 13, 14, the idling movements of the assembly are not transmitted to the vehicle body or the side member 8. Because of the recesses, a very progressive characteristic curve of the bearing 4 is obtained in the event of pressure loads or tensile loads.

The free end of the support arm 2 facing away from the elastic bearing 4 is connected by way of a hard rubber bearing 11 or a ball bearing with the console supporting block 5, which should permit only the rotational movement during the springing of the assembly.

Figure 4:
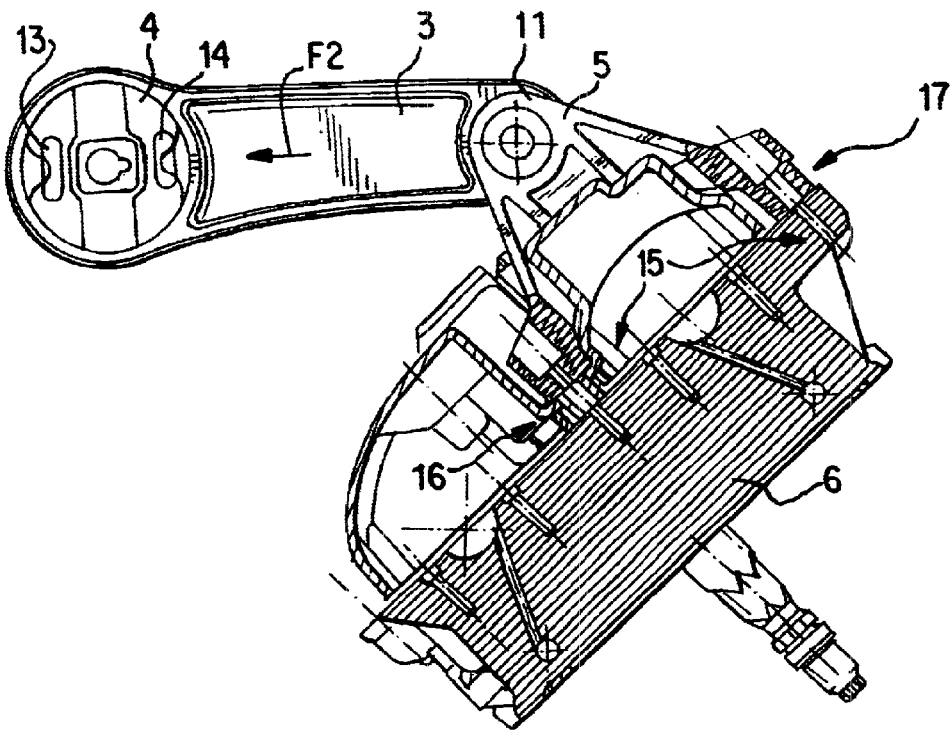
FIG. 4 is a sectional view of the fastening of the support arm on the camshaft housing.
Figure 5:
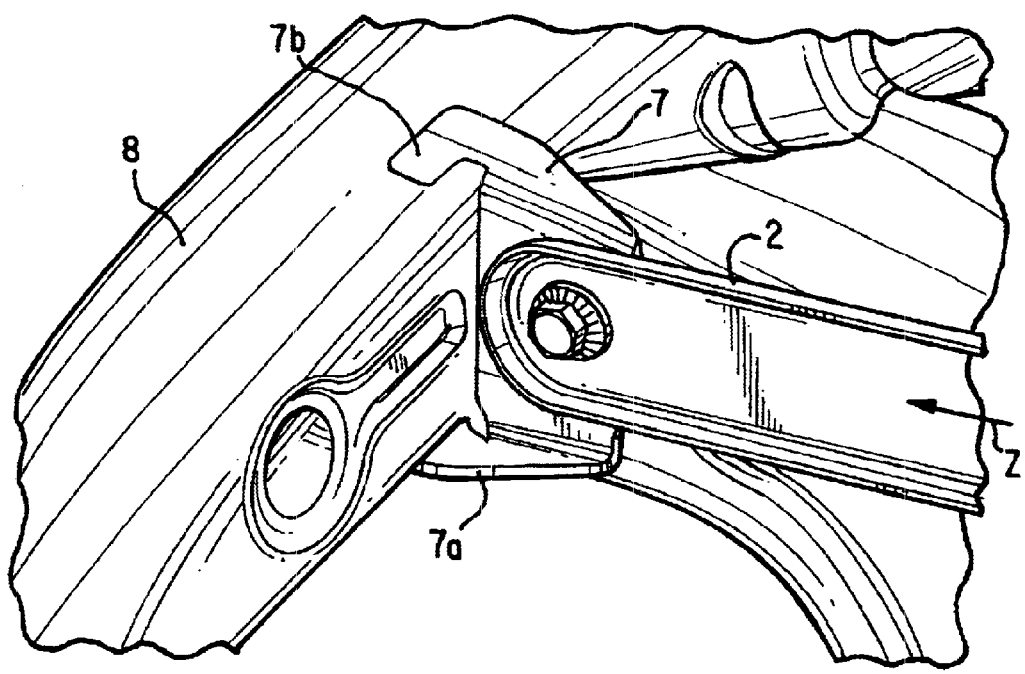
FIG. 5 is a sectional view of the strut with the sheet metal angle and the fastening on the side member.
Figure 6:
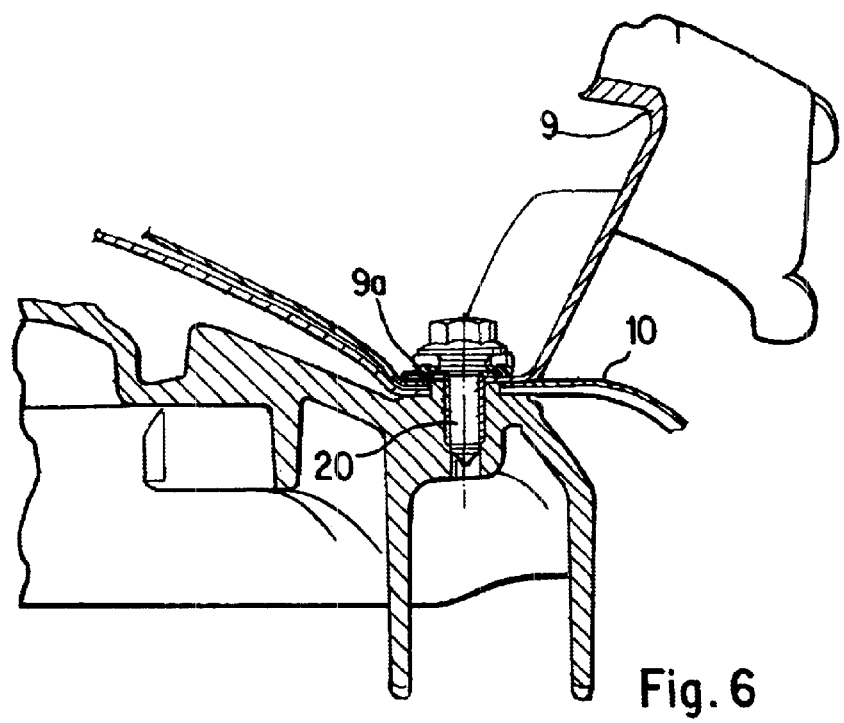
FIG. 6 is a sectional view of the fastening of the vehicle body block on the spring strut dome.
Figure 7:
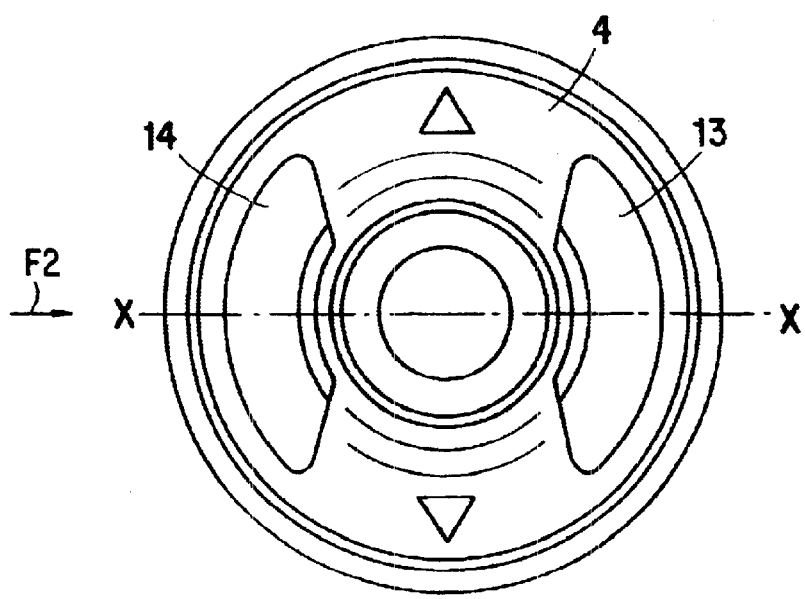
FIG. 7 is a frontal view of the bearing with the kidney-shaped recesses.

As illustrated in detail in FIG. 4, the console supporting block 5 connected with the rubber bearing 11 is fixed by means of its foot 15 on the camshaft housing 6, for example, in recesses 16, 17 and is fixed by means of screws which are shown only as lines.

The strut 3 is, on the one hand, by means of the receiving block 9 and, on the other hand, by way of the sheet metal angle 7 rigidly fixed on the spring strut dome 10 and on the side member 8 of the vehicle body structure. For this purpose, the sheet metal angle 7 has two legs 7a, 7b which reach over the side member 8 from above and from below, so that the strut 3 takes up a position with respect to the side member 8, which causes an introduction of force from the strut 3 into the side member 8 approximately in the center in the direction of the arrow Z.

The connection of the receiving block 9 with the spring strut dome 10 takes place by way of a bent-out section 9a, which rests on the spring strut dome 10 and is connected by means of a screw 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. System for supporting the torque of an internal-combustion engine in a vehicle by way of at least one torque support which is arranged transversely in the vehicle between the internal-combustion engine and a vehicle body support member and is connected with the vehicle body structure, wherein the torque support is constructed of at least two parts and comprises:
 a support arm connected with one of a cylinder head cover and a camshaft housing by a pivoting bearing, and
 an adjoining strut held by way of a stationary elastic bearing, which strut is fastened on an end side on a support member of body structure of the vehicle,
 wherein the support arm is held by one end on the one of the cylinder head cover and the camshaft housing by way of the pivoting bearing in a console supporting block and is supported by means of its other end in the elastic bearing which is stationarily disposed on a spring strut dome by way of a receiving block.

2. System according to claim 1, wherein the strut is rigidly connected with the receiving block and is supported by an end facing the support arm in the elastic bearing which is held in the receiving block.

3. System according to claim 1, wherein the console supporting block can be fixed by its foot in receiving devices of the camshaft housing.

4. System according to claim 1, wherein the elastic bearing connecting the support arm with the strut is constructed as a damping bearing with two kidney-shaped recesses which are aligned in a direction of pressure load of the torque support behind one another in a horizontal plane.

5. System according to claim 1, wherein the strut has a sheet metal angle on an end side, which sheet metal angle is connected with the support member of the vehicle body structure and has two legs which reach over the support member from above and from below, and wherein the strut ends in front of the support member, which causes an introduction of force from the strut into the support member approximately in the center in the direction of the support member.

6. System according to claim 2, wherein the elastic bearing is arranged in a bearing eye of the support arm with said support arm being situated between the receiving block and wherein the strut, and the receiving block reaches over the strut for the purpose of fastening by two arms and has a bent-out device for fastening with the spring strut dome.

7. System according to claim 2, wherein the console supporting block can be fixed by its foot in receiving devices of the camshaft housing.

8. System according to claim 2, wherein the elastic bearing connecting the support arm with the strut is constructed as a damping bearing with two kidney-shaped recesses which are aligned in a direction of pressure load of the torque support behind one another in a horizontal plane.

9. System according to claim 2, wherein the strut has a sheet metal angle on an end side, which sheet metal angle is connected with the support member of the vehicle body structure and has two legs which reach over the support member from above and from below, and wherein the strut ends in front of the support member, which causes an introduction of force from the strut into the support member approximately in the center in the direction of the support member.

10. System according to claim 3, wherein the elastic bearing connecting the support arm with the strut is constructed as a damping bearing with two kidney-shaped recesses which are aligned in a direction of pressure load of the torque support behind one another in a horizontal plane.

11. System according to claim 3, wherein the strut has a sheet metal angle on an end side, which sheet metal angle is connected with the support member of the vehicle body structure and has two legs which reach over the support member from above and from below, and wherein the strut ends in front of the support member, which causes an introduction of force from the strut into the support member approximately in the center in the direction of the support member.

12. System according to claim 6, wherein the console supporting block can be fixed by its foot in receiving devices of the camshaft housing.

13. System according to claim 6, wherein the elastic bearing connecting the support arm with the strut is constructed as a damping bearing with two kidney-shaped recesses which are aligned in a direction of pressure load of the torque support behind one another in a horizontal plane.

14. System according to claim 6, wherein the strut has a sheet metal angle on an end side, which sheet metal angle is connected with the support member of the vehicle body structure and has two legs which reach over the support member from above and from below, and wherein the strut ends in front of the support member, which causes an introduction of force from the strut into the support member approximately in the center in the direction of the support member.

15. System according to claim 7, wherein the elastic bearing connecting the support arm with the strut is constructed as a damping bearing with two kidney-shaped recesses which are aligned in a direction of pressure load of the torque support behind one another in a horizontal plane.

16. System according to claim 12, wherein the elastic bearing connecting the support arm with the strut is constructed as a damping bearing with two kidney-shaped recesses which are aligned in a direction of pressure load of the torque support behind one another in a horizontal plane.

17. System for supporting the torque of an internal-combustion engine in a vehicle by way of at least one torque support which is arranged transversely in the vehicle between the internal-combustion engine and a vehicle body support member and is connected with the vehicle body structure, wherein the torque support is constructed of at least two parts and comprises:
a support arm connected with one of a cylinder head cover and a camshaft housing by a pivoting bearing, and
an adjoining strut held by way of a stationary elastic bearing, which strut is fastened on an end side on a support member of body structure of the vehicle,
wherein the strut has a sheet metal angle on an end side, which sheet metal angle is connected with the support member of the vehicle body structure and has two legs which reach over the support member from above and from below, and
wherein the strut ends in front of the support member, which causes an introduction of force from the strut into the support member approximately in the center in the direction of the support member.

18. System for supporting the torque of an internal-combustion engine in a vehicle by way of at least one torque support which is arranged transversely in the vehicle between the internal-combustion engine and a vehicle body support member and is connected with the vehicle body structure, wherein the torque support is constructed of at least two parts and comprises:
a support arm connected with one of a cylinder head cover and a camshaft housing by a pivoting bearing, and
an adjoining strut held by way of a stationary elastic bearing, which strut is fastened on an end side on a support member of body structure of the vehicle,
wherein the elastic bearing connecting the support arm with the strut is constructed as a damping bearing with two kidney-shaped recesses which are aligned in a direction of pressure load of the torque support behind one another in a horizontal plane,
wherein the strut has a sheet metal angle on an end side, which sheet metal angle is connected with the support member of the vehicle body structure and has two legs which reach over the support member from above and from below, and
wherein the strut ends in front of the support member, which causes an introduction of force from the strut into the support member approximately in the center in the direction of the support member.

\* \* \* \* \*